F. W. MEYER.
SPEED CONTROL FOR INDUCTION MOTORS.
APPLICATION FILED JUNE 20, 1914.

1,262,824.                                    Patented Apr. 16, 1918.

WITNESSES:
Fred H Miller
D. C. Davis

INVENTOR
Friedrich W. Meyer
BY
ATTORNEY

UNITED STATES PATENT OFFICE.

FRIEDRICH W. MEYER, OF PITTSBURGH, PENNSYLVANIA, ASSIGNOR TO WESTINGHOUSE ELECTRIC AND MANUFACTURING COMPANY, A CORPORATION OF PENNSYLVANIA.

SPEED CONTROL FOR INDUCTION-MOTORS.

1,262,824.

Specification of Letters Patent.

Patented Apr. 16, 1918.

Application filed June 20, 1914. Serial No. 846,363.

*To all whom it may concern:*

Be it known that I, FRIEDRICH W. MEYER, a subject of the Emperor of Germany, and a resident of Pittsburgh, in the county of Allegheny and State of Pennsylvania, have invented a new and useful Improvement in Speed Controls for Induction-Motors, of which the following is a specification.

My invention relates to methods of controlling the speed of induction motors and more particularly to the speed control of large motors, such as those employed in driving rolling mills and similar apparatus, wherein rectifiers are employed in conjunction with other control apparatus.

The object of my invention is to provide a system of the character specified, wherein the speed may be readily controlled throughout a wide range, in an efficient and effective manner and without the necessity of having moving contacts except those carrying comparatively small currents.

Figure 1:
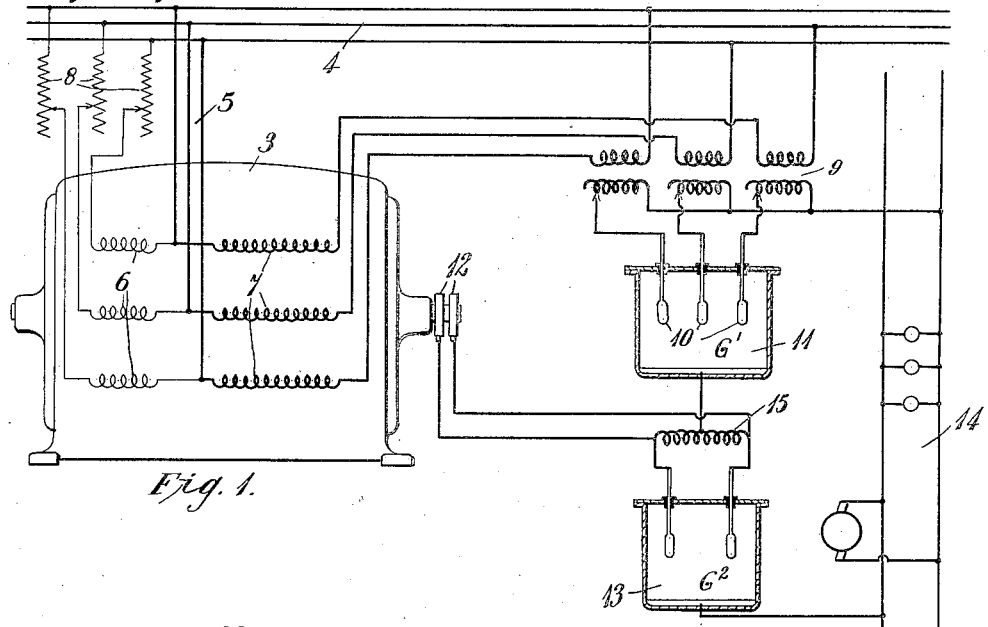
Figure 2:
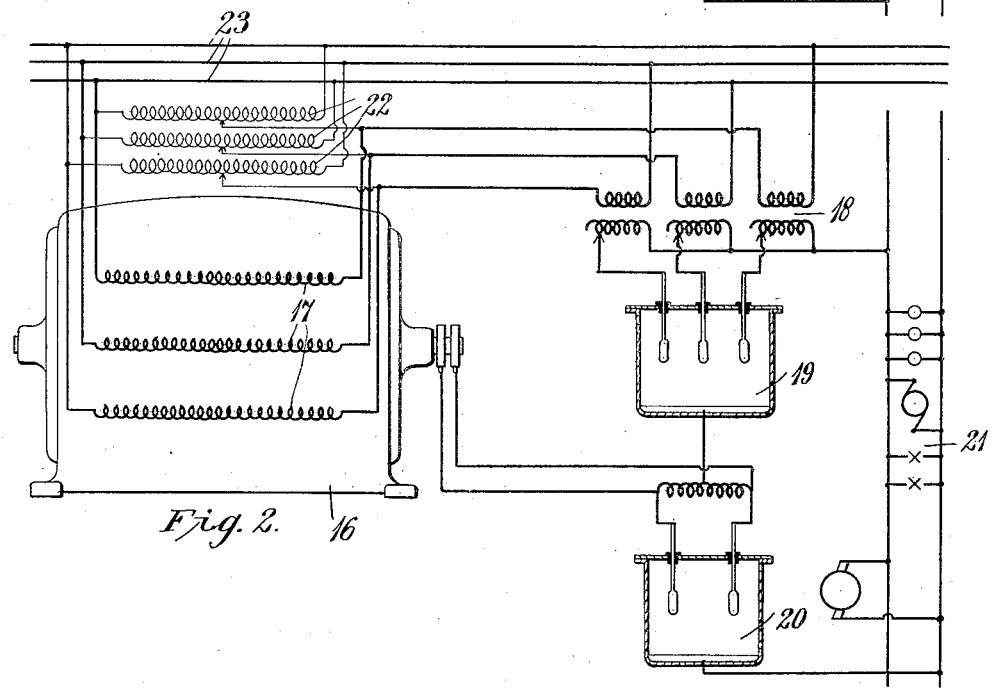

Referring to the accompanying drawing, Figure 1 is a diagrammatic view of circuits and apparatus embodying my invention; and Fig. 2 is a diagrammatic view of a modification of the circuits of Fig. 1.

Referring to the form of my invention shown in Fig. 1, 3 is an induction motor supplied with energy from an alternating-current system 4 by suitable leads 5. The primary winding of the motor 3 is split into two portions, a magnetizing winding 6 and a working winding 7. The winding 7 is arranged on the stator of the motor 3 as an ordinary three-phase delta winding and likewise the winding 6. The relative location of the two windings is immaterial, the vertices of the "delta" of the winding 6 may be in line with the vertices of the delta of the winding 7 or they may lie opposite the mid-points of the sides thereof. The specific arrangement chosen is determined by winding convenience and not by operating considerations. The amount of current flowing through the magnetizing windings 6 may be varied by suitable adjustable rheostats 8. Current, after traversing the working windings 7, flows through the primary windings of a transformer 9 and thence back to the system 4 if delta connections are employed, as shown, or to a common point if it is desired to employ star connections. The secondary windings of the transformer 9 are adjustably connected to the anodes 10 of a rectifying device 11, preferably of the mercury vapor type. The current generated in the secondary member of the motor 3 is taken off by suitable slip rings 12 and supplied to a rectifier 13, preferably of the vapor arc type. The rectifiers 11 and 13 are operated in series on a suitable constant-potential consumption circuit 14 by means of a suitable compensating winding 15.

The fact that the voltage across the mains 14 is held constant serves to hold the voltage across the two rectifiers 11 and 13 constant. Thus, if the voltage imposed upon one of said rectifiers by the corresponding winding of the induction motor be raised, the voltage across the other rectifier must be reduced in a complementary sense, as the sum of the two rectifying voltages is constant. I use the term "complementary," in its well known meaning, as that quantity which must be added to a quantity to produce a fixed and given third quantity. Thus, as the voltage across the rectifier 11 in increased, the voltage across the rectifier 13 is correspondingly decreased and vice versa.

Having described the arrangement of the circuits in my control system, the operation is as follows: On reducing, for instance, the controlling current through the magnetizing windings 6, by means of the rheostat 8, the field of the motor will become weakened, and the back electromotive force induced in the windings 7 by the transformer action between the windings 6 and 7 will also be lowered. Since the voltage across the winding 7 and the primary members of the transformer 9 is constant, a reduction of the back electromotive force in the winding 7 will increase the potential at the transformer 9, and, concurrently, raise the potential across the terminals of the rectifier 11. Since the sum of the voltage across the rectifiers 11 and 13 is a constant, equal to the voltage of the system 14, an increase of the voltage across the rectifier 11 results in a reduction of the voltage across the rectifier 13, resulting in a lowering of the electromotive force of the secondary member of the motor 3. Accordingly, not quite so much energy will be transmitted by the secondary winding into the direct-current network. The difference in energy will be supplied from the rectifier 11.

The following is a theoretical consideration of the speed changes which result from the adjustment of the component parts of my circuits, assuming a supplied system wherein all elements are single-phase, in order to avoid complication.

Let

E represent the line voltage, $E_m$ the active magnetizing voltage at the stator of the induction machine, $E_o$ the voltage in the continuous-current network, $E_h$ the voltage of the auxiliary rectifier, $E_r$ the rotor voltage of the induction motor.

Now, if for sake of simplicity we assume that the number of turns of the machine's rotor and stator are the same, that the ratio of transformation at the transformers is equal to 1, and, finally, that the losses, and the small magnetizing components relative to the transformers, are of negligible magnitude, then, the strength of the current in the main windings will throughout be $=J$. Thus, the stator field and the rotor field neutralize each other, and the main stator winding is, consequently, simply a compensating winding. However, such exact equalization is not necessary as is desired in commutator machines for the purpose of achieving good commutation, it being, on the contrary, sufficient, in this case, for the windings to result in more or less correct average equalization.

However, as pointed out, there is a controlling or magnetizing-current winding provided for the stator the current $i$ of which may be regulated by a transformer, or, since the magnetizing current may here easily be made very small, by a resistance, so that it may be adjusted at will.

While I will denote by $i$ the magnetizing current as present under changing circumstances, there is $i_o$ the normal magnetizing current when the stator voltage is equal to the total network pressure of the three-phase line, which, so far as the machine is concerned, is assumed only single phase.

Furthermore, let $N_o$ represent the corresponding normal number of magnetic flux lines, and $N$ the respective number of magnetic flux lines in the machine when regulation is taking place. And finally:

$n_o$ the normal synchronous number of revolutions or speed, and $n$ the speed as prevailing during regulation.

It will be plain that the magnetizing stator voltage $E_m$ will then be dependent upon the corresponding magnetizing current $i$ and the relation $$E_m = E\frac{N}{N_o} = E\frac{i}{i_o}$$

holds good.

However, there is, furthermore, with more or less approximation the relation $$n = n_o - n_o\frac{E_r}{E_m},$$

where due account is taken of the speed drop as caused by the counter electromotive force at the rotor. Now, since the total of the rectifier voltages, on the one hand, is equal to the pressure in the continuous current network, thus:

$$E_r + E_h = E_o$$

while, on the other hand, the total of the stator voltage and auxiliary rectifier electromotive force equals the pressure at the three-phase current line $$E_m + E_h = E,$$

thus, $$E_r = E_o - E_h = E_o - E + E_m,$$

there follows also that $$n = n_o - n_o\frac{E_o - E + E_m}{E_m}$$

or $$n = n_o - n_o\frac{E_o - E + \frac{i}{Ei_o}}{\frac{i}{Ei_o}} = n_o\left(\frac{E - E_o}{E}\right) \cdot \left(\frac{i_o}{i}\right)$$

If $$E = 200V.$$

and the pressure of the continuous current network is now:

$$E = 100V.$$

then, when $$i = i_o,$$

the value $$n = n_o - n_o\frac{100 - 200 + 200}{200} = \frac{1}{2}n_o$$

while, for $$i = \frac{1}{2}i_o$$

there results now $$n = n_o - n_o\frac{100 - 200 + 100}{100} = n_o$$

It will thus be noticed that we are able to make the regulation continuous from one half synchronous speed up to normal synchronism. A further reduction of the magnetizing current would be of no use, because, under such conditions, the voltage $E_h$ at the auxiliary rectifier would be higher than pressure $E_o$ of the continuous current line, and rectifier $G^1$ would have to charge the voltage in inverse ratio to the current, which would not be feasible; that is to say, the induction motor's speed can, in this case, not readily be brought beyond synchronism.

It is apparent that it would be practicable to regulate the speed of the motor 3 substantially to synchronism, since the entire voltage of the system 14 may be supplied by the rectifier 11 and, in addition, the back electromotive force of the arc in the rectifier 13, whereby the electromotive force across the slip rings 12 would be substantially zero.

The more extensive the range of speed regulation, the higher should be the voltage of the system 14 with respect to line voltage, or else suitable changes should be made in the transforming device. The natural consequence also is that, with a greater range of speed control, it will be necessary to have a greater range of adjustment in the magnetizing current. Since it is quite difficult to obtain a control of the speed from standstill to synchronism by the above described means, I find that it is a good plan to start the motor 3 by means of any suitable starter of the auto transformer type or otherwise. I have found the ballast-wire type of starter to be especially successful for this character of work. In this device, the resistance element is of some material having a high positive temperature resistance co-efficient such, for example, as iron, inclosed in inert atmosphere, such, for example, as hydrogen. A resistance element of this description will be highly heated at first by the heavy starting current and will oppose considerable resistance to the flow thereof, but the subsequent lowering of the resistance, due to the falling off of the current taken by the motor, will soon cause its effect to be negligible. I consider the use of the auto starter as no part of my present invention and hence do not illustrate the same in detail.

Referring to the form of my invention shown in Fig. 2, 16 is an induction motor of ordinary construction provided with a primary winding 17 of the three-phase, delta type. The primary winding of a transformer 18 is connected in series with the primary winding 17, and the current flowing therethrough is the working current for the machine. The transformer 18 supplies a rectifier 19, connected in series with a rectifier 20 supplied from the secondary member of the motor 16, the sum of the voltages across the two rectifiers being maintained constant by a connection to a constant potential direct-current supply and consumption current 21.

Adjustable auto transformers 22 are connected to the alternating-current supply system 23 and shunted across the primary windings 17 so that a variable, independently controlled magnetizing current may be superposed thereupon. By the use of phase-varying devices and by the adjustable feature of the auto transformers, the magnetizing current may be given any desired amount and any desired phase angle with respect to the working current which flows through the primary windings 17 and through the transformer 18. Not only does this system of connection give a more flexible adjustment of the power factor and speed of the induction motor than the system of Fig. 1 but it is also more economical in its use of power, because the ohmic loss in the resistance members 8 is avoided.

I claim as my invention:

1. The combination with an induction motor provided with a double primary winding, one portion of which is adapted to furnish magnetizing current and the other portion of which is adapted to furnish working current, of means for controlling the amount of excitation furnished by the magnetizing winding, means for controlling the amount of energy absorbed in the working portion of the primary winding, and complementary means for controlling the amount of energy generated in the secondary member, whereby the speed of the induction motor may be controlled.

2. The combination with an induction motor provided with two primary windings, of means for dynamically interlinking the circuit of one of said windings with a direct-current circuit, whereby only energy current may flow in said winding, whereby all magnetizing current demanded by said motor is caused to flow in the other of said primary windings.

3. The combination with an induction motor provided with a magnetizing winding independent of the primary working winding, of a device arranged to absorb energy from the current of said primary working winding, a device arranged to absorb energy from the secondary member of the induction motor, a constant-potential consumption circuit, and means for causing said energy-absorbing devices to operate in series on said consumption circuit.

4. The combination with an induction motor, of a device for absorbing energy from the primary circuit thereof and a device for absorbing energy from the secondary member thereof, and means for causing said energy-absorbing means to be supplementary to each other in their action.

5. The combination with an induction motor provided with mutually supplementary energy-absorbing devices in its primary and secondary circuits, respectively, of means for controlling the speed thereof comprising means for varying the magnetizing flux independently of the primary working current.

6. The combination with an induction motor provided with a magnetizing winding in addition to a primary working winding, of a constant-potential load circuit, a rectifying device connected in series relation with the primary working winding, a rectifying device connected in series relation with the secondary winding, and connections for causing said rectifying devices to operate in series with each other on their direct-current sides on said constant-potential load circuit.

7. The combination with an induction motor provided with a magnetizing winding in addition to a primary working winding, of a rectifying device connected in series relation with the primary working winding, a rectifying device connected in series relation with the secondary winding, a constant-potential consumption circuit, and means for causing said rectifying devices to operate in series with each other on their direct current sides on said consumption circuit.

8. The combination with an induction motor provided with means whereby the primary working current may be controlled independently of the magnetizing current, of means for controlling the amount of energy absorbed in the working portion of the primary winding, and complementary means for controlling the amount of energy generated in the secondary member, whereby the speed of the induction motor may be controlled.

9. The combination with an induction motor provided with means whereby the primary working current may be controlled independently of the magnetizing current, of a device arranged to absorb energy from the current of said primary working winding, a device arranged to absorb energy from the secondary member of the induction motor, a constant-potential consumption circuit, and means for causing said energy-absorbing devices to operate in series on said consumption circuit.

10. The combination with an induction motor provided with two primary windings and with a secondary winding, of means for dynamically interlinking the circuit of one of said windings with a direct-current-consumption circuit of substantially constant potential, and means for dynamically interlinking the circuit of said secondary winding with said consumption circuit in series relation with said first named dynamic interlinkage, whereby an increase in the voltage across said primary winding necessitates a reduction in the voltage across said secondary winding and vice versa.

In testimony whereof, I have hereunto subscribed my name this 19th day of June, 1914.

FRIEDRICH W. MEYER.

Witnesses:
D. C. Davis,
B. B. Hines.